July 21, 1964 H. RINIA ETAL 3,141,979

CRYOTRON ARRANGEMENT AND CRYOTRONS SUITABLE FOR USE IN SUCH ARRANGEMENTS

Filed March 31, 1959 2 Sheets-Sheet 1

INVENTORS
HERRE RINIA
JACOB FREDRIK KLINKHAMER
BY
Frank R. Jifari
AGENT

INVENTORS
HERRE RINIA
JACOB FREDRIK KLINKHAMER
BY
AGENT

United States Patent Office 3,141,979
Patented July 21, 1964

3,141,979

CRYOTRON ARRANGEMENT AND CRYOTRONS SUITABLE FOR USE IN SUCH ARRANGEMENTS

Herre Rinia and Jacob Fredrik Klinkhamer, Emmasingel, Eindhoven, Netherlands, assignors to North American Philips Company, Inc., New York, N.Y., a corporation of Delaware Filed Mar. 31, 1959, Ser. No. 803,203
Claims priority, application Netherlands Mar. 31, 1958
16 Claims. (Cl. 307—88.5)

Figure 1:
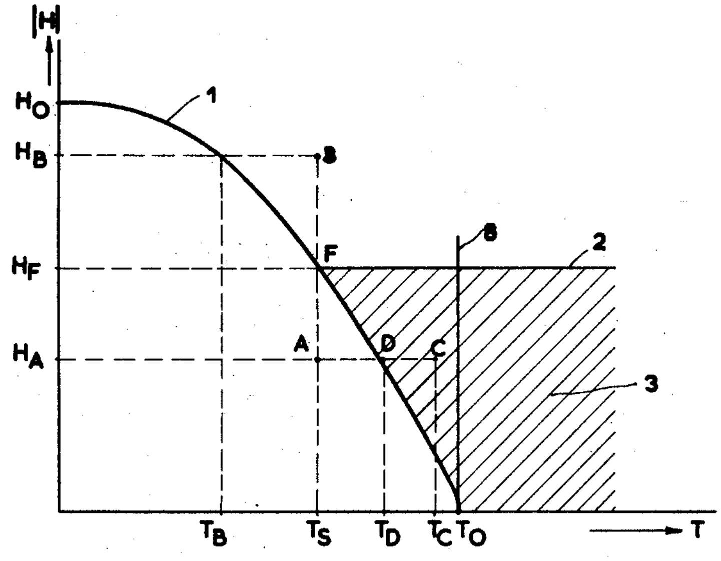

This invention relates to a cryotron arrangement which contains a cryotron having a current conductor made of super-conductive material which has a stable normal-conductivity state and a stable super-conductivity state. It also relates to a cryotron suitable for use in such an arrangement and to particular embodiments thereof. The term "cryotron" as used herein is to be understood to mean in a broad sense a switching element which comprises a current conductor made of super-conductive material and means to cause this first-mentioned current conductor to pass from a super-conductivity state to a normal-conductivity state and vice versa, such as, for example, a second current conductor for the application of a magnetic field in the first-mentioned current conductor. In a cryotron arrangement the cryotron is arranged in an environment at so low a temperature, for example, a few degrees Kelvin, that the super-conductive state of the cryotron can be reached. Such a switching element having two conductivity states can be used for a variety of switching applications, more particularly, in memory circuits and logic circuits.

In the proceedings of the I.R.E., April 1956, pages 482 et seq., a number of superconductor properties are described which are of importance for a cryotron. Furthermore, in the said publication a cryotron has been proposed the operation of which is based on the property of many super-conductive materials that their transition temperature, that is to say, the temperature at which a transition from the superconductive state to the normal-conductivity state and vice versa is effected, is raised or lowered by increasing or reducing, respectively, the magnetic field strength in the superconductor. As is well known, the transition temperature of a superconductor is determined solely by the value of the total magnetic field strength to which both an external magnetic field and the self-induced magnetic field of a superconductive body passing current may contribute. The cryotron proposed in the said publication in principle comprises a current conductor made of super-conductive material, the so-called gate conductor, on which a number of turns of a second current conductor, the so-called control conductor, are wound. By controlling the strength of the current flowing through the control conductor winding, the magnetic field strength in the gate conductor can be varied and, at a constant appropriate ambient temperature, this gate conductor can be caused at will to assume the super-conductivity state or the normal-conductivity state. This is so because at a constant ambient temperature with a magnetic field strength exceeding a certain critical field strength, which is determined by a certain critical value of the current flowing through the control conductor, the gate conductor is in the normal-conductivity state and, below this critical magnetic field strength and critical current strength respectively, it is in the super-conductive state.

This known cryotron arrangement is usually operated at a constant ambient temperature, the conductivity state of the current conductor of the cryotron being determined only by the magnetic state of the cryotron, that is to say, by the absolute value of the magnetic field strength in the gate conductor. Necessarily the magnetic state of the cryotron is different for either conductivity state, while the cryotron keeps a certain conductivity state only so long as an associated magnetic state is maintained. In the normal-conductivity state in the known cryotron arrangement the temperature of the gate conductor and the ambient temperature are always higher than the effective transition temperature of the conductor, the term "effective" indicating the transition temperature value associated with the given magnetic state of the cryotron.

It is an object of the invention to introduce a special principle into the cryotron technology, which enables a simple and particularly suitable cryotron arrangement to be obtained which, with a given magnetic condition and at a constant ambient temperature, can have both a stable super-conductivity state and a stable normal conductivity state and which by a temporary variation, for example, a variation of this magnetic condition, can be caused at will to assume either one conductivity state or the other for any required prolonged period of time. It is a further object of the invention to provide special embodiments of a cryotron suitable for use in such an arrangement.

A cryotron arrangement in accordance with the invention containing a cryotron having a current conductor made of superconductive material which has a stable normal-conductivity state and a stable super-conductivity state, is characterized in that the said current conductor is connected to a current source and is thermally insulated from its environment, the thermal resistance of the current conductor with respect to its environment and the heat dissipation in the current conductor in the normal-conductivity state being such that owing to the resulting temperature difference between the current conductor and its environment the normal-conductivity state occurs at an ambient temperature which is lower than, or at most equal to, the effective transition temperature of the current conductor.

A cryotron in accordance with the invention utilizes the difference in heat dissipation in a current-carrying superconductor body between the normal-conductivity state and the super-conductivity state. It is based, inter alia, on the recognition that a stable normal-conductivity state of a current-carrying superconductor body can be obtained at an ambient temperature which is lower than, or at most equal to, the effective transition temperature if the heat dissipation occurring in the normal-conductivity state is used, in combination with a suitable thermal insulation of the superconductor body from its environment, to maintain the body itself, in spite of the said lower ambient temperature, at a temperature higher than the effective transition temperature, so that a stable normal-conductivity state is produced. So long as the heat dissipation is maintained, the body remains in the normal-conductivity state. Therefore, in a cryotron arrangement in accordance with the invention, the current conductor is connected to a current source which is capable of supplying a current which is suited to produce the heat dissipation desired in the normal-conductivity state, while provision is made of a refrigerating system to keep the environment of this current conductor at a temperature which is lower than, or at most equal to, the effective transition temperature of the current conductor.

A cryotron which is suitable for use in a cryotron arrangement in accordance with the invention comprises a current conductor made of a superconductive material which is thermally insulated from its environment. The thermal resistance between this current conductor and its environment and the electric resistance of the current conductor in the normal-conductivity state being such that, with a suitable choice of the strength of the current flowing through this current conductor and of its magnetic state at a suitable chosen ambient temperature which is lower than, or at most equal to, the effective transition temperature of this current conductor, this current conductor can have a stable normal-conductivity state owing to the temperature difference between the current conductor and its environment resulting from the heat dissipation in, and from the said thermal resistance of, the current conductor in the normal-conductivity state. There is a variety of alternative embodiments of such a cryotron which fall within the scope of the invention. A particularly simple cryotron in accordance with the invention solely comprises a current conductor having a heat-insulating jacket, both the current conductor and the heat insulation satisfying the above-mentioned requirements. A number of further embodiments of the cryotron in accordance with the invention will be described more fully hereinafter.

In addition to a magentic field for effecting the desired magnetic condition and a suitable refrigerating system to maintain the desired ambient temperature, a cryotron arrangement in accordance with the invention comprises means for changing over from one stable conductivity state to the other. Although in principle this changeover is not limited to any particular method and can be effected by any suitable temporary variation of the conditions, for example, of the temperature, the magnetic field strength or the heat dissipation, according to a further aspect of the invention the current conductor is preferably caused to pass from one stable conductivity state to the other stable conductivity state by a suitable temporary variation of the strength of the current passing through the said current conductor. The transition from the normal-conductivity state to the super-conductivity state is accomplished by temporarily reducing the current strength to an extent such that the heat dissipation in the conductor is insufficient to keep the temperature of the conductor above the effective transition temperature. The transition from the super-conductivity state to the normal-conductivity state is achieved by temporarily increasing the strength of the current flowing through the current conductor to an extent such that total magnetic field strength built up by the self-induced magnetic field and any external magnetic field is sufficiently large to destroy the super-conductivity. If a second current conductor is provided, under suitable circumstances, as will be described more fully hereinafter, the cryotron can be caused to assume either conductivity state by a temporary variation of the magnetic field produced by this current conductor.

Although the invention describes more particularly a cryotron arrangement in which the two stable conductivity states can be used with substantially the same magnetic condition and at the same ambient temperature, it is not restricted to this special embodiment, but generally relates to any cryotron arrangement in which a stable normal-conductivity state is utilized which is produced owing to the thermal insulation and the heat dissipation at an ambient temperature which is lower than, or at most equal to, the effective transition temperature, irrespective of the conditions under which the super-conductivity state is utilized.

Figure 2:
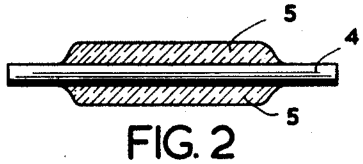
Figure 3:
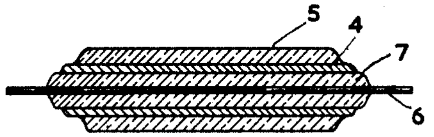
Figure 4A:
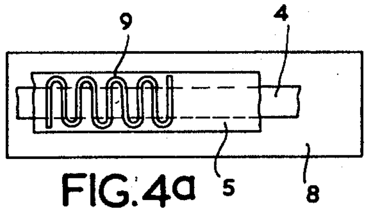
Figure 4B:
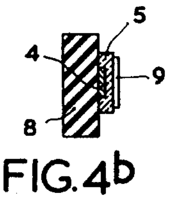
Figure 5:
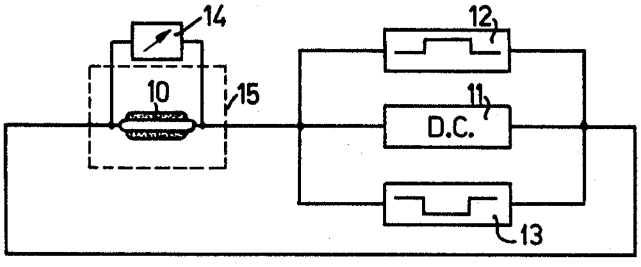

In order that the invention may readily be carried out, embodiments thereof will now be described with reference to the accompanying drawings, in which:

FIG. 1 illustrates the inventive idea by a graphical representation of the variation of the transition temperature T of a superconducting body as a function of the magnetic state thereof which is determined by the absolute value of the magnetic field strength |H| in the body, FIG. 2 is a diagrammatic cross-sectional view of a cryotron suitable for use in a cryotron arrangement in accordance with the invention, FIGS. 3 and 4*b* are cross-sectional views of alternative embodiments of cryotrons suitable for use in a cryotron arrangement in accordance with the invention, FIG. 4*a* is a plan view of the cryotron shown in FIG. 4*b*, FIG. 5 shows a suitable circuit.

In FIG. 1, the temperature T is plotted horizontally to a linear scale and the absolute value of the magnetic field strength |H| in the current conductor is plotted vertically, likewise to a linear scale. Both quantities are in arbitrary units and have their zero value in the origin 0 of the co-ordinate system. A curve 1 shows diagrammatically the general, known variation of the transition temperature characteristic of a superconductor. This characteristic curve intersects the T-axis at the temperature $T_0$, the latter value representing the transition temperature occurring at a magnetic field strength equal to zero. The transition temperature approaches 0° Kelvin for the magnetic field strength $H_0$. Between these values the transition temperature characteristic curve of a superconducting body generally shows a parabolic variation. For tantalum and thallium, for example, $T_0$ is 4.38° K. and 2.38° K. and $H_0$ about 860 Oersted and 170 Oersted, respectively. In order to enable the superconductivity state and the normal-conductivity state of a superconductor body to be utilized at a constant ambient temperature, the ambient temperature is made lower than $T_0$, preferably at most a few tenths of degrees Kelvin lower than $T_0$, for example, $T_s$, as is indicated in FIG. 1. Since in practice an ambient temperature of 4.2° K. can be maintained constant with comparative simplicity, since this temperature corresponds to the boiling point of helium at atmospheric pressure, tantalum, for example, is very suitable for use in a cryotron arrangement. However, other superconductors having different transition temperatures can also be used. An amibent temperature lower than 4.2° K. may be obtained by reducing the pressure over the helium bath, while a higher ambient temperature can be obtained by increasing this pressure to a value exceeding atmospheric pressure.

A state of a superconductor body, for example, of the gate conductor of the known cryotron, can be indicated in FIG. 1 by a point or, if its state is not perfectly homogeneous throughout its volume, by a small area. In the superconductivity state, the operating point lies within the region bounded by the curve 1, the T-axis and the H-axis, while an operating point of the normal-conductivity state lies outside of this region. At the ambient temperature $T_S$ the known cryotron arrangement is in the super-conductivity state if its operating point, which at the given ambient temperature is determined by its magnetic condition only, lies somewhere on the vertical broken line at $T_S$ between F and $T_S$, for example, at A. The gate conductor of the known cryotron arrangement is caused to pass from the state A to the normal conductivity state by increasing the magnetic field strength in the gate conductor with the aid of the control conductor, that is to say, by moving the operating point from A along the vertical broken line to above F, for example, to B. So long as the magnetic condition $H_B$ corresponding to B is maintained, the gate conductor remains in the normal-conductivity state B. If, however, the magnetic field strength is reduced to the initial value, the gate conductor returns to the super-conductivity state A. Thus, in the known cryotron arrangement use is made of a normal-conductivity state which occurs at an ambient temperature higher than the effective transition temperature associated with the magnetic condition of the normal-conductivity state, as may be seen from FIG. 1, in which the ambient temperature $T_S$ is always higher than the effective transition temperature $T_B$ so long as B is situated above F.

In contradistinction thereto, in the cryotron arrangement in accordance with the invention, use is made of a normal-conductivity state at which the ambient temperature of the environment is lower than or at most equal to the effective transition temperature. Hence, in the cryotron arrangement in accordance with the invention, the operating point describing the normal-conductivity state lies in a shaded region 3 of FIG. 1, which is bounded by a straight line 2, the position of which is determined by the ambient temperature, and by the curve 1, the curve 1 being considered not to belong to the operating range in contradistinction to the straight line 2. This is possible in a cryotron arrangement in accordance with the invention because the current conductor is insulated from its environment and, at least in the normal-conductivity state, passes a sufficiently large current. Hence, in the normal-conductivity state, this conductor can assume a temperature which is higher than the ambient temperature, more particularly higher than its effective transition temperature, since the heat dissipation in the normal-conductivity state together with the thermal insulation can bring about a temperature difference between the current conductor and its environment, which difference can be influenced by the choice of these two factors. However, in the super-conductivity state there is no heat dissipation and the current conductor substantially assumes the ambient temperature, which is lower than the effective transition temperature.

This effect will now be explained more fully with reference to FIG. 2, which is a sectional view of a particularly simple embodiment of a cryotron in accordance with the invention. This cryotron comprises only a current conductor 4 made, for example, of tantalum, and enclosed by a thermally insulating jacket 5. The assembly may be symmetrical about the longitudinal axis. The current conductor 4 is arranged in an environment having the temperature $T_S$ (FIG. 1) and connected to a current source which, for example, supplies a constant current. This current produces a self-induced field in the conductor 4 the value of which is given in FIG. 1 along the H-axis, for example, by $H_A$. If this current is large enough, this cryotron has two stable conductivity states in substantially the same magnetic condition $H_A$, namely a super-conductivity state A and a normal-conductivity state C. In actual fact there may occur a difference in current distribution about the sectional area between the two conductivity states owing to the skin effect. Since this is not of importance for the essential operation of the cryotron, this possible difference is neglected and it is also assumed that the same magnetic condition obtains if the current flowing through the conductor 4 is equal in magnitude in both conductivity states. The conductor 4 can assume the stable super-conductivity state A because owing to the absence of the heat dissipation in this state its temperature $T_A$ is substantially equal to the ambient temperature $T_S$, which is lower than the effective transition temperature $T_D$. However, under the same conditions the current conductor 4 may also be in a stable normal-conductivity state C, since in this state by reason of its thermal insulation and the heat dissipation caused by the current it can assume the temperature $T_C$, which is higher than $T_S$, and more particularly, higher than $T_D$, its effective transition temperature. The initial conditions determine which of these two states the conductor attains. Once it is in the super-conductivity state, it remains in this state as long as the conditions remain the same. The same applies to the normal-conductivity state. The conductor 4 can be caused to pass from the super-conductivity state A to the normal-conductivity C by applying a current pulse to it which for a short period of time so increase the current flowing through the conductor that the self-induced magnetic field of the conductor destroys the super-conductivity state. This current pulse, which is applied for a very short period of time, initiates the normal-conductivity state which is then maintained in the state C by the heat dissipation produced. From the state C, the normal-conductivity state, the conductor can be restored to the super-conductivity state A by applying for a short period of time a negative current pulse which during this time reduces the current through the current conductor to a value such that the amount of heat dissipated in the conductor is sufficient to keep it at a temperature higher than the effective transition temperature. Hence, it returns to the super-conductivity state A which is then maintained by the absence of the heat dissipation. In a cryotron arrangement using such a cryotron the thermal insulation must be appropriately proportioned, and the current flowing through the conductor which gives rise to the two different stable conductivity states must be large enough to maintain, together with the thermal insulation, a sufficiently large temperature difference in the normal-conductivity state between the conductor and its environment. On the other hand, this current must not be excessive, but should be smaller than the critical current strength above which the self-induced magnetic field of the conductor would prevent the occurrence of the super-conductivity state at the given ambient temperature. A proper proportioning of a cryotron arrangement which satisfies these requirements can readily be effected by anyone skilled in the art. In addition, an example of such proportioning will be given hereinafter.

By using a tubular hollow conductor instead of a solid conductor 4, the switching speed of the cryotron can be increased, for as a result the thermal capacity is reduced without materially altering the current distribution in the super-conductivity state, since in this state the current already flows substantially along the surface owing to the skin effect. The inertia of a cryotron arrangement in accordance with the invention is determined by the values of the heat dissipation, the thermal capacity of the conductor, the thermal resistance of the thermal insulation and, as the case may be, the thermal resistance of the surface of contact between the cryotron and its environment. As will be proved hereinafter with reference to a proportioning example, high-speed cryotrons can be obtained by suitable proportioning. The temperature difference occurring in the conductor between the two conductivity states is preferably made as small as is possible in view of the desired stability of the cryotron, for example, 0.2° K. or 0.1° K.

In a further particularly suitable cryotron in accordance with the invention, the current conductor is a hollow tubular conductor arranged concentrically about a second, inner conductor. FIG. 3 is a sectional view of such a cryotron. In this embodiment, a tubular conductor 4 is arranged, together with its thermal insulating jacket 5, about a concentric inner conductor 6. A thermally and electrically insulating layer 7 is arranged intermediate the two conductors and acts as a support for the tubular conductor 4. Such a system may be manufactured in a simple manner by starting from the concentric inner conductor 6 and applying thereto in succession the layers 7, 4 and 5 by the usual techniques, for example, by deposition from vapour. Preferably the inner conductor is made of a superconductive material having a considerably higher effective transition temperature than the conductor 4. A very suitable material for the inner conductor is, for example, niobium, which remains superconductive in the entire operating range of tantalum. According to a further aspect of the invention, the concentric inner conductor 6 can be used to high advantage in a cryotron arrangement in accordance with the invention to shift the critical current strength of the conductor 4 at a constant temperature. If a current is supplied to the inner conductor in a direction opposite to the current supplied to the concentric outer conductor, the magnetic field strength in this outer conductor is decreased, whereas a current flowing through the inner conductor in the same direction as the current flowing through the outer conductor increases the magnetic field strength in the latter. For this purpose the concentric inner conductor can pass, in operation, a current of constant strength in order to decrease or to increase the critical current strength by a constant amount. Alternatively, a current may be supplied to this conductor temporarily so that the critical current strength of the conductor 4 is shifted only temporarily.

As has been described hereinbefore, in a cryotron arrangement in accordance with the invention, the current conductor can be caused to pass from one stable conductivity state to the other stable conductivity state by a temporary sufficiently large variation of the strength of the current flowing through this conductor. According to a further aspect of the invention, the transition can also be accomplished in a simple manner by a temporary sufficiently large variation of an external magnetic field which contributes to the magnetic field strength in the conductor, provided that the temperature of the conductor in the normal conductivity state is lower than its transition temperature for a magnetic field strength equal to zero. In a cryotron arrangement which satisfies this requirement, the normal-conductivity state consequently lies, in FIG. 1, within the region bounded by the transition temperature characteristic curve 1, the straight line 8' and the straight line 2, for example, at point C. In a cryotron arrangement using a cryotron of the kind shown in FIG. 3, variation of the current flowing through the concentric inner conductor 6 can be used to vary the external magnetic field. The conductor 4 can be caused to pass from the normal-conductivity state C to the state A by applying to the concentric inner conductor for a short period of time a current pulse in a direction opposite to the direction of current flow in the conductor 4. This pulse decreases the magnetic field strength in this conductor and, in FIG. 1, lowers the operating point C along the broken line C–$T_C$ until the operating point crosses the curve 1 and enters the super-conductivity state which, on termination of the current pulse, is then maintained by the absence of heat dissipation at point A. By applying a sufficiently large current pulse in the opposite direction, the operating point of the conductor 4 can be raised from A along the broken straight line $T_S$–B in the direction of B until it crosses the curve 1, whereupon the conductor becomes normally conductive and, on termination of the current pulse, is maintained in the stable state C by the heat dissipation. With this method of switching, the strength of the current flowing through the conductor 4 can be kept constant. It is obvious that a combination of the two methods of switching may be used, if desired.

Although this latter method of switching states has been explained with reference to a cryotron of the kind shown in FIG. 3, the use of this method obviously is not restricted to a cryotron having a concentric inner conductor but can be used generally with any cryotron having one conductor which is arranged to be influenced by the magnetic field of a second conductor, for example, in an arrangement analogous to the known cryotron arrangement in which the gate conductor is encircled by a control conductor winding. In this case, the cryotron arrangement in accordance with the invention is distinguished from the known arrangement in that the conductor is thermally insulated and, in the normal-conductivity state, passes a current so that in the normal-conductivity state the operating point occurs at an ambient temperature which is lower than, or at most equal to, the effective transition temperature. In a cryotron as shown in FIG. 3, it is also possible to provide a control conductor winding about the thermal insulation 5. Of the concentric inner conductor and the outer control conductor winding one, preferably the former, may pass a constant current which shifts the critical field strength in the conductor 4, while the other, preferably the control conductor winding, has current pulses applied to it which bring about the variation of the magnetic field strength in the conductor required for changing over. In both methods of changing over, the transition from the super-conductivity state to the normal-conductivity state is initiated by a switching pulse applied either to the conductor 4 itself, or to a second conductor, which raises the magnetic field strength in the conductor 4 above point F. With a given geometry of the cryotron, the value of the switching pulse is determined, inter alia, by the size of the distance A–F (FIG. 1). Generally it is desirable both for the rest current flowing through the cryotron and for the switching current to be small. This may, if desired, be improved by choosing the ambient temperature $T_S$ in close proximity to $T_0$. However, according to a further aspect of the invention, as an alternative, the current conductor 4 may be subjected to a constant external magnetic field. This magnetic field is adjusted so that, together with the rest current which is chosen as small as is possible in view of the heat dissipation, it moves the operating point A near to F. Large numbers of cryotrons can be subjected in this manner to a common external constant magnetic field. Alternatively, in a cryotron according to FIG. 3, a constant current may be passed through the concentric inner conductor 6 for this purpose.

In a cryotron arrangement in accordance with the invention, the heat dissipation in the current conductor must be high enough per unit of length to maintain the required temperature difference with the environment in the normal-conductivity state. This heat dissipation is determined not only by the strength of the current flowing through the conductor, but also by the resistance per unit of length. In order to increase this resistance, use may be made of super-conductor alloys having a high specific resistivity or of hollow conductors. An alternative method, which offers particular advantages for cryotrons, consists in that the current conductors are provided on a support as conductor strips in the form of very thin layers. Thus, large numbers of cryotrons can be combined to form a cryotron arrangement on a support together with an associated network by means of known techniques such as deposition from vapour, imprinting by chemical means, and so on. By the reduction of the bulk of the cryotron the required heat dissipation per cryotron is also reduced and consequently the evaporation losses of the cooling medium are also reduced. FIG. 4 shows an embodiment of such a structure. On a support 8 the current conductor of a cryotron is provided in the form of a thin straight conductor strip 4 enclosed by a thermal insulating jacket 5. On this thermal insulating jacket a control conductor 9 is provided in the form of a zig zagging conductor strip. The conductor 4 can be connected to a source of constant current which gives rise to the two stable conductivity states, while the control conductor 9 can be used for changing over from one state to the other.

The cryotron arrangement in accordance with the invention is particularly suited for use as a memory element and can also be used in logic circuits. Such a cryotron arrangement can use a stable normal conducting state and a stable super-conductivity state in the same magnetic condition. A characteristic difference between these states may then be ascertained from the potential difference between the two ends of the conductor, since in the super-conductivity state there is no potential difference, but in the normal-conductivity state there is a potential difference. In the cryotron of FIG. 2 the conductivity state can be ascertained by applying to the current conductor a test pulse which is at least equal to the pulse required to cause the conductor to pass from the super-conductivity state to the normal-conductivity state, but is smaller than the critical current strength. If the cryotron was already in the normal-conductivity state, the potential difference between the ends of the conductor is the same before and after the test pulse; if the cryotron was in the super-conductivity state, the test pulse causes it to pass to the normal-conductivity state so that the potential difference before the pulse is different from that after the pulse.

In FIGURE 5 a schematic drawing of an embodiment of a cryotron arrangement according to the invention is shown. The cryotron 10 is the same as shown in FIGURE 2, and is connected in series with a source 11 of D.C. current, which provides a suitable D.C. bias current for maintaining the current conductor in the normal conduction state or in the superconduction state. Parallel to this D.C. source 11 are connected in series with the cryotron 10 a source 12 of pulsed current, which is used for delivering positive current pulses for exciting the conductor into the normal conduction state, and a source 13 of pulsed current which is used for delivering negative current pulses for reducing the current in the circuit and restoring the superconducting state. The ends of the current conductor of the cryotron 10 are connected with an indicator 14, which may be for instance a high impedance voltmeter which detects a potential difference between the ends when the current conductor is in the normal state and which indicates zero potential difference when the current conductor of the cryotron is in the superconducting state. The dashed line 15 indicates the presence of a suitable refrigerating apparatus. It should be noted however that the invention is not limited to this arrangement. For example, the refrigerating apparatus may include a system of cryotrons and the potential difference at the ends of the current conductor may be used to drive other cryotrons. Furthermore, the potential difference of many such cryotrons may be used for providing the current source to the gate conductor of the known type of cryotrons as described in the introduction for switching this known type of cryotron from the superconductive state to the normal state or vice versa.

For a person skilled in the art there are many alternative methods which fall within the scope of the invention. Thus, use may be made of two stable conductivity states with different magnetic conditions, for example in FIG. 2, with different currents flowing through the conductor 4. In this event the difference in current strength contributes to the characteristic difference between the two conductivity states.

An example of the proportions of a cryotron and a cryotron arrangement in accordance with the invention will now be given in which use is made of a number of formulas, but obviously the invention is not restricted to these formulas.

The calculation relates to a cryotron comprising a tantalum strip provided on a support by deposition from vapour, which must be capable of being operated at a suitable ambient temperature of 4.2° K.—the boiling point of helium at atmospheric pressure—and of having a stable normal-conductivity state and a stable super-conductivity state at a suitable value of the rest current. As the thermal insulating material use is made of SiO having a thermal conductivity $\chi=10^{-3}$ W/cm.° K. The electric specific resistivity $\rho$ and the specific heat $\gamma$ of tantalum are taken to be $1.5\times10^{-8}$ Ωcm. and $2.5\times10^{-3}$ Wsec./cc.° K., respectively, in accordance with the value given in the literature.

If the cross-sectional area of the tantalum strip is made extremely small compared with the cooling surface of the thermal insulation, the lateral heat dissipation along the ends of the tantalum strip is small as compared with the heat dissipation along the cooling surface of the thermal insulation so that with a reasonably good approximation the lateral heat dissipation can in the first instance be neglected and we can start from the following relation which at equilibrium applies to the normal conductivity state:

$$W=G\times\Delta\times T=I^2R \qquad (1)$$

...ere W is the heat dissipation in watts in the tantalum ..., G the thermal conductivity in watts per degree ...in (° K.) of the thermal insulation, ΔT the tempera-...ifference in ° K. which occurs at equilibrium between the current conductor and its environment, I the current flowing through the tantalum strip in amperes and R the electric resistance in ohms. We further have the following known formulas:

$$G=\frac{\chi\times 0}{d} \qquad (2)$$

$$R=\rho\frac{l}{D} \qquad (3)$$

$$C=\gamma lD \qquad (4)$$

where G is the thermal conductivity defined hereinbefore of the thermal insulation, $\chi$ the thermal conductivity of the thermal insulation in watts/cm. ° K., 0 the surface area of the thermal insulation in sq. cms., $d$ the thickness of the thermal insulation layer in cms., R the resistance defined hereinbefore, $\rho$ the specific resistivity in Ω cm., $l$ the length in cms. and D the sectional area in sq. cms. of the conductor strip, C the thermal capacity of the conductor strip in W.sec./° K. and $\gamma$ the specific heat in W.sec./cc. ° K.

The switching time $\delta t$, which is required to cause the conductor strip to pass from the normal-conductivity state to the super-conductivity state, is assumed to be with a reasonably good approximation:

$$\delta t=\frac{C}{G} \qquad (5)$$

since this is the time in seconds which a body of temperature T requires to fall between the temperature T and the ambient temperature $T_s$ for the $1/e$th part of the temperature difference $(T-T_s)$. C is taken to be the thermal capacity of the tantalum strip but this is slightly too favourable since the thermal capacity of the thermal insulation may also exert some influence.

From the preceding formulas it can be deduced in simple manner:

$$W'\delta t=0\Delta T \qquad (6)$$

where $$W'=\frac{W}{I}$$

represents the heat dissipation per cm. of the length of the tantalum strip. If, now, it is assumed that the dimensions of the sectional area of the tantalum strip are $10^{-5}\times10^{-2}$ sq. cms. and the temperature difference $\Delta T=0.1°$ K., according to the Formula 6 for tantalum, which has a specific heat $\gamma=2.5\times10^{-3}$ W.sec./cc. ° K., we have:

$$W'\Delta T=2.5\times10^{-3}\times10^{-7}\times10^{-1}=2.5\times10^{-11}$$

If the permissible heat dissipation per cm. of length of the tantalum strip $W'=100$ microwatts, the required switching time $\delta t=0.25$ microsecond. According to the Formula 3 the resistance R of the tantalum strip per cm. of its length thus is 0.15 Ω. The required rest current I passing through the tantalum strip can be calculated with the aid of (1) to be about 26 ma. The potential difference between the ends is zero in the super-conductivity state, while in the normal-conductivity state it is $$0.15\times26\times10^{-3}$$

volts=4 millivolts per cm. of the length of the tantalum strip. This potential difference or, if desired, the potential difference of a number of such conductor strips may be manipulated externally in a circuit arrangement, if required, through an amplifier.

The thickness of the thermal insulating layer SiO now can be readily calculated with the aid of Formulas 1 and 2. It is assumed that the tantalum strip has a flat face engaging a thermal highly insulating support and is covered at the edges and at the supper surface by a layer of SiO. The support thickness is made such that the heat is mainly conducted away via the upper surface through the layer of SiO, the contributions of the thin edges being neglected with respect to the much broader upper surface. Thus, from the calculation there follows a thickness of the SiO-layer of 100 microns.

If the cryotron calculated hereinbefore is used in a cryotron arrangement which is operated at an ambient temperature of 4.2° K., the temperature of the tantalum strip in the super-conductivity state can be 4.2° K., and in the normal-conductivity state, since $\Delta T=0.1°$ K., 4.3° K. In order to enable the two stable conductivity states of the tantalum strip to be achieved at 4.2° K., in the cryotron arrangement the magnetic condition of the tantalum strip must be adjusted so, either by means of an external field or by the self-induced magnetic field, that the effective transition temperature lies between these two temperatures, for example, at 4.25° K. As can be calculated in known manner from the transition temperature characteristic of tantalum, this requires a magnetic field strength of about 50 Oersted in the tantalum strip. The mean field strength produced by the self-induced magnetic field of the tantalum strip with the given circumference of $2\times10^{-4}$ m. and a rest current of 26 ma. is about 1.5 Oersted, as can be calculated as a first approximation from the known formula $H\times\sigma=I$, where H is the mean magnetic field strength in *a./m.*, $\sigma$ the circumference in metres and I the current in amperes. Hence the self-induced magnetic field is negligible compared with the magnetic field required. Therefore, in a cryotron arrangement which is operated at 4.2° K., an external magnetic field is applied which produces the required 50 Oersted in the tantalum strip. A changeover from the super-conductivity state to the normal-conductivity state can be effected with the aid of a temporary sufficiently large variation of the current flowing through the tantalum strip so that the self-induced magnetic field together with the external magnetic field for a short period of time exceeds the magnetic field strength corresponding to a transition temperature of 4.2° K. This field strength is about 75 Oersted for tantalum. The change-over may alternatively be effected by sufficient variation of an external magnetic field which may be produced by a second conductor through which a current flows. The cryotron may be caused to pass from the normal-conductivity state to the super-conductivity state either by temporarily reducing the current flowing through the strip to zero or by the variation of an external magnetic field.

The cryotron calculated hereinbefore can be operated at a higher ambient temperature without the use of a constant external magnetic field. Since the effective transition temperature is 4.38° K. with the self-induced magnetic field of 1.5 Oersted, the normal conductivity state can be reached at a temperature of the tantalum strip exceeding 4.38° K., that is to say, with the given $\Delta T=0.1°$ K. the ambient temperature must be higher than 4.28° K. However, for the super-conductivity state to be ensured, the ambient temperature must be lower than 4.38° K. Preferably the ambient temperature is made, say, 4.33° K. This temperature can be obtained comparatively simply in practice, since it corresponds to the boiling point of helium under a pressure of about 850 mms. of Hg.

Finally it should be noted that the invention obviously is not restricted to the above-described embodiments. Nor is it restricted to the method of calculation used therein. Without departing from the scope of the invention, improvements adapted to the particular experimental circumstances can be made by anyone skilled in the art.

What is claimed is:

1. A cryotron comprising a current conductor constituted of superconductive material and possessing a stable normal-conductive state and a stable super-conductive state, means for cooling the environment of the current conductor to a given ambient temperature, means thermally insulating the current conductor from the said environment, and means for passing current through the conductor when in its normal-conductive state at which the resultant heat dissipation maintains the current conductor at a temperature above the given ambient temperature to maintain said normal-conductive state, said given ambient temperature being not greater than the effective transition temperature at which the current conductor is switched from its super-conductive to its normal-conductive state.

2. A cryotron as set forth in claim 1 wherein the thermally insulating means comprises an insulating jacket surrounding the current conductor.

3. A cryotron as set forth in claim 1 wherein the current conductor is a hollow, tubular conductor.

4. A cryotron comprising a current conductor constituted of superconductive material and possessing a stable normal-conductive state and a stable super-conductive state, refrigerating means for cooling the environment of the current conductor to a given ambient temperature, means thermally insulating the current conductor from the said environment, means for passing current through the conductor when in its normal-conductive state at which the resultant heat dissipation maintains the current conductor at a temperature above the given ambient temperature to maintain said normal-conductive state, said given ambient temperature being not greater than the effective transition temperature at which the current conductor is switched from its super-conductive to its normal-conductive state, and means for switching the current conductor from its super-conductive to its normal-conductive state.

5. A cryotron as set forth in claim 4 wherein the current conductor comprises a hollow, tubular conductor, and the switching means includes a second conductor arranged within and insulated from the hollow, tubular conductor.

6. A cryotron as set forth in claim 5 wherein the second conductor is constituted of a super-conductive material having an effective transition temperature higher than that of the said current conductor.

7. A cryotron as set forth in claim 4 wherein the switching means includes an external control conductor.

8. A cryotron as set forth in claim 4 wherein external means are provided furnishing a constant magnetic field at the current conductor.

9. A cryotron as set forth in claim 4 further comprising means for producing a steady-state magnetic field in the current conductor which is the same for both its super-conductive and normal-conductive states.

10. A cryotron comprising a current conductor constituted of superconductive material and possessing a stable normal-conductive state and a stable super-conductive state, means for cooling the environment of the current conductor to a given ambient temperature, means thermally insulating the current conductor from the said environment, means for passing current through the conductor when in its normal-conductive state at which the resultant heat dissipation maintains the current conductor at a temperature above the given ambient temperature to maintain said normal conductive state, said given ambient temperature being not greater than the effective transition temperature at which the current conductor is switched from its super-conductive to its normal-conductive state, and means for switching the current conductor from its super-conductive to its normal-conductive state, said means including means for temporarily increasing the magnetic field in the current conductor to a value at which it attains its normal-conductive state.

11. A cryotron as set forth in claim 10 wherein th[illegible] last-named means includes means for temporarily [illegible] creasing the current passing through the said [illegible] conductor.

12. A cryotron as set forth in claim 1[illegible] switching means includes a second con[illegible] be caused to increase the said magneti[illegible] its current.

13. A cryotron as set forth i[illegible]

prising means for switching the current conductor from its normal-conductive state to its super-conductive state, said latter means including means for temporarily decreasing the current in the current conductor to decrease said resultant heat dissipation and place said current conductor in said super-conductive state.

14. A cryotron as set forth in claim 13 wherein the same current transverses the current conductor in both its super-conductive and normal-conductive state.

15. A cryotron comprising a current conductor constituted of super-conductive material and possessing a stable normal-conductive first state and a stable super-conductive second state, means for cooling the environment of said current conductor to a given ambient temperature, said given ambient temperature being not greater than the effective transition temperature of said current conductor, means thermally insulating said current conductor from said environment, means for passing current through said current conductor, and means for selectively switching said current conductor from one of said first and second stable conductive states to the other of said stable conductive states, said means for switching comprising first means for temporarily decreasing said current passing through said current conductor to switch said current conductor from said first stable conductive state to said second stable conductive state and second means for temporarily increasing said current passing through said current conductor to switch said current conductor from said second stable state to said first stable state, said current passing through said current conductor when said current conductor is switched to said normal-conductive state being sufficient to provide a resultant heat dissipation to maintain said current conductor at a temperature above said given ambient temperature to maintain said normal-conductive state.

16. A cryotron comprising a current conductor constituted of super-conductive material and possessing a stable normal-conductive state and a stable super-conductive state, means for cooling the environment of said current conductor to a given ambient temperature, said given ambient temperature being not greater than the effective transition temperature of said current conductor, means thermally insulating said current conductor from said environment, means for passing current through said current conductor to provide a resultant heat disssipation sufficient to maintain said current conductor at a temperature above said given ambient temperature to maintain said normal-conductive state, and means for switching said current conductor from said normal-conductive state to said super-conductive state, said means for switching comprising means for temporarily decreasing the current passing through said current conductor to decrease sufficiently said heat dissipation to switch said current conductor from said normal conductive state to said super-conductive state.

References Cited in the file of this patent

UNITED STATES PATENTS

| | | |
|---|---|---|
| 2,189,122 | Andrews | Feb. 6, 1940 |
| 2,944,211 | Richards | July 5, 1960 |

OTHER REFERENCES

Proceedings of the I.R.E., April, 1956, "The Cryotron," by D. A. Buck, pages 482–493.